(12) United States Patent
Morgan et al.

(10) Patent No.: US 6,807,009 B2
(45) Date of Patent: Oct. 19, 2004

(54) ANTI-PDL BEAM SWAPPING

(75) Inventors: John Paul Morgan, Toronto (CA); Joshua Philipson, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 44 days.

(21) Appl. No.: 10/292,545

(22) Filed: Nov. 13, 2002

(65) Prior Publication Data

US 2003/0090807 A1 May 15, 2003

Related U.S. Application Data

(60) Provisional application No. 60/331,294, filed on Nov. 14, 2001.

(51) Int. Cl.[7] .............................................. G02B 27/14
(52) U.S. Cl. ........................................ 359/634; 398/68
(58) Field of Search ................................ 359/497, 634, 359/637, 638, 639, 640, 281, 249, 256; 398/65, 68, 79, 147, 152

(56) References Cited

U.S. PATENT DOCUMENTS

| 6,014,256 A | 1/2000 | Cheng ........................ 359/495 |
| 6,285,500 B1 | 9/2001 | Ranalli et al. .............. 359/497 |
| 6,360,034 B1 | 3/2002 | Chang ......................... 385/18 |
| 6,441,960 B1 * | 8/2002 | Wang et al. ................. 359/497 |
| 2002/0067887 A1 | 6/2002 | Tomlinson et al. ........... 385/37 |
| 2002/0122251 A1 | 9/2002 | DeBoynton et al. ........ 359/484 |

* cited by examiner

*Primary Examiner*—Scott J. Sugaman
*Assistant Examiner*—Richard Hanig
(74) *Attorney, Agent, or Firm*—Teitelbaum & MacLean; Neil Teitelbaum; Doug MacLean

(57) ABSTRACT

The invention provides an optical device including a polarization diversity unit for receiving an input optical signal and producing two beams of light having a same polarization state therefrom, a beam swapping element disposed for receiving the first and second beams of light and for redirecting the two beams of light to a same overlapping area of a modulator, and a reflective surface for reflecting the two beams of light back to the polarization diversity unit where they are combined to form an output optical signal. The beam swapping element is designed and positioned such that the first and second beams of light swap positions upon reflection from the reflective surface and trace out the other's optical path. Advantageously, this optical arrangement essentially eliminates all PDL and PMD.

21 Claims, 3 Drawing Sheets

ANTI-PDL BEAM SWAPPING

CROSS-REFERENCE TO RELATED APPLICATIONS

This application claims priority from U.S. Provisional Appl. No. 60/331,294 filed on Nov. 14, 2001.

MICROFICHE APPENDIX

Not Applicable

FIELD OF THE INVENTION

The present invention generally relates to the field of optical communication systems, and in particular to a method and optical device for anti-PDL beam swapping.

BACKGROUND OF THE INVENTION

In optical wavelength division multiplexed (WDM) communication systems, a single optical waveguide simultaneously carries many different communication channels in light of different wavelengths. In general, each communication channel is assigned a nominal centre wavelength, and the channel spacing, or separation, is defined for the network. The closer the channel spacing, the greater the number of channels that may be transmitted over an optical fiber of the network. The International Telecommunications Union has proposed Dense WDM (DWDM) network standards with optical signal channels having a frequency separations of 25, 50, and 100 GHz (equivalent to a wavelength separation of about 0.2, 0.4 and 0.8 nm, respectively). Lower frequency separations are envisioned. Accordingly, the performance requirements for DWDM networks (such as those for bandwidth, cross talk, polarization dependent loss, polarization mode dispersion, and insertion loss) are becoming more stringent.

Unfortunately, many of the optical components used DWDM communication systems are polarization sensitive. For example, the diffraction gratings used in the dynamic gain equalizer (DGE), configurable optical add/drop multiplexer (COADM), and wavelength blocker (WB) taught in U.S. patent application Nos. 200020067887, 20020009257, (Attorney Doc. No. 10-510), incorporated herein by reference, are typically polarization sensitive. Accordingly, a front-end unit that provides light having a predetermined polarization is included in these designs, and others. In general, the front-end unit includes one or more polarization beamsplitters and one or more half-waveplates. The polarization beamsplitters split an input optical signal into two orthogonally polarized sub-beams of light, while the half-wave plate(s) alters the polarization of at least one of the beams so that both sub-beams have a same polarization state. A disadvantage of polarization beamsplitters is that they typically introduce a difference in optical path length for the two spatially separated sub-beams of light, and thus introduce polarization mode dispersion (PMD).

In addition to the front-end unit, these designs also include a liquid crystal (LC) array or a micro-electro-mechanical systems (MEMS) array. LC and MEMS arrays have played an important part in optical communication systems, since they are designed to simultaneously switch/modify spatially resolved portions of the optical signal independently from each other and because they are designed to be compact, have a low power consumption, and be mass produced at a low cost. Unfortunately, both LC cells and MEMS components often exhibit local spatial dependencies. For example, the retardance provided by an addressable region of a LC modulator is not necessarily uniform over the entire region, while individual reflective MEMS elements often exhibit an undesired curvature at the outer regions thereof. Since each element of the above mentioned arrays exhibits performance variations for each sub-beam of light transmitted thereto, each sub-beam will typically be altered to a different extent. This introduces polarization dependent loss (PDL).

It is an object of the instant invention to provide a method and device that lessens or obviates both PMD and PDL.

It is an object of this invention to provide an optical device that has the same optical path length for two split sub-beams of light propagating therethrough.

It is an object of this invention to provide an optical device that uses the same region of a MEMS or LC or other modulator device for two split sub-beams of light propagating thereto.

SUMMARY OF THE INVENTION

The instant invention relates to a method and apparatus that reduces or eliminates PDL and PMD in optical devices that use a polarization diversity unit to produce two spatially separated beams of light having a same polarization state. In particular, the invention relates to a method and apparatus using a beam swapping element disposed for receiving the two beams of light and for redirecting the two beams of light to a same overlapping area of a modulator, where they are modified and reflected back to the polarization diversity unit. The beam swapping element is designed and positioned such that the two beams of light swap positions upon reflection from the modulator.

In accordance with the invention there is provided a method of beam swapping comprising the steps of: providing an input optical signal; spatially separating the input optical signal into first and second beams of light having orthogonal polarizations; rotating the polarization of at least one of the first and second beams of light so that the first and second beams have a same polarization state; routing the first beam of light to a first surface of a beam swapping element and the second beam of light to a second other surface of the beam swapping element, the first and second surfaces disposed to redirect the first and second beams of light, respectively, to a same location; modifying the first and second beams substantially at the same location and reflecting them in a backwards directions such that the first beam of light is transmitted to the second surface of the beam swapping element and the second beam of light is transmitted to the first surface of the beam swapping element; and rotating the polarization of at least one of the first and second beams of light transmitted such that they have orthogonal polarization states and recombining them to form an output optical signal.

In accordance with the invention there is further provided an optical beam swapping device comprising: a polarization diversity unit for receiving an input optical signal and producing a first beam of light and a second beam of light therefrom, the first and second beams of light having a same polarization state; a beam swapping element disposed for receiving the first and second beams of light and for redirecting the two beams of light to a same point; a modulator disposed substantially about the same point for modifying the first and second beams of light; and a reflective surface for reflecting the two modified beams of light back to the polarization diversity unit where they are combined to form an output optical signal, wherein each of the first and second beams of light traces out the other's optical path in reverse.

In accordance with the instant invention there is provided an optical beam swapping device comprising: a polarization diversity unit for receiving an input optical signal and producing a first and a second beam of light therefrom; a beam swapping element disposed for receiving the first and second beams of light and for redirecting the two beams of light to a same point; an optical component having a local spatial dependence on an optical property disposed substantially at the same point; and a reflective surface disposed for receiving the two beams of light directed to the same point and reflecting them back to the polarization diversity unit where they are combined to form an output optical signal, wherein each of the first and second beams of light is reflected in a backward propagating direction along an optical path that the other beam of light followed to the reflective surface in a forward propagating direction.

In accordance with the instant invention there is provided an optical device comprising: polarization diversity means for providing first and second spatially separated beams of light from a single input beam of light; reflective means disposed for receiving the first and second beams of light and redirecting them back to the polarization diversity means where they are recombined into a single output beam of light; and a beam swapping element optically disposed between the polarization diversity means and the reflecting means for forcing the first and second beams of light to swap optical paths upon reflection from the reflecting means.

Advantageously, providing a beam swapping element forces each sub-beam of light produced by the birefringent crystal to trace out the other's path through the module in order to minimize the difference in retardance and/or optical path experienced by each of the beams.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENTS

The instant invention provides a method and optical device that provides beam-swapping such that two sub-beams of light transmitted from a polarization beamsplitter 'swap' positions (e.g., switch optical paths) upon reflection from a reflective surface such that they both experience the same optical path lengths and optical environment before being recombined at the polarization beamsplitter.

Figure 1:
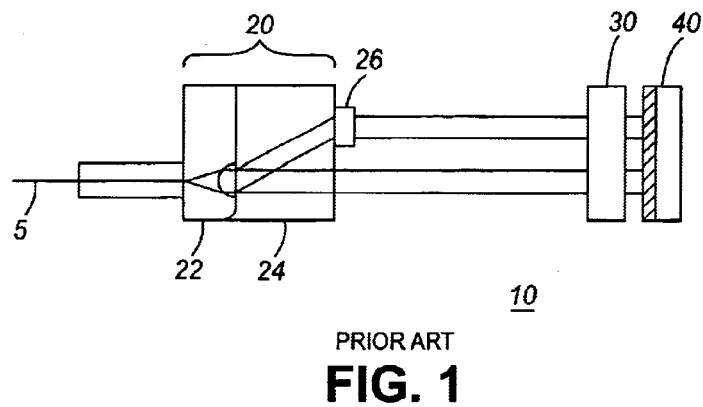
FIG. 1 illustrates a prior art variable optical attenuator.

Turning now to FIG. 1, there is shown a schematic diagram of a prior art folded variable optical attenuator. The attenuator 10 includes a polarization diversity unit 20, a liquid crystal modulator 30, and a reflector 40. The polarization diversity unit 20 includes a microlens 22, a birefringent crystal 24, such as rutile, and a half-wave plate 26. The liquid crystal modulator 30 is a twisted nematic, nematic, or other liquid crystal transmissive array. Typically, an optical circulator (not shown) is coupled to optical fibre 5 to separate input and output signals.

In operation, an optical signal transmitted from optical fiber 5 is collimated by microlens 22 and is transmitted to the birefringent crystal 24 where orthogonal components are separated. In particular, the birefringent crystal 24 walks-off one of the components such that two sub-beams of light having orthogonal polarizations states are produced. The half-wave plate 26 rotates the polarization of one of the beams (i.e., the e-beam) so as to ensure that both sub-beams of light have the same polarization state. Both sub-beams of light propagate along parallel optical paths until they reach the liquid crystal modulator 30, where they pass through the same or different addressable region (or cell), and are reflected off the reflector 40 in a backwards direction. In particular, each sub-beam of light is retro-reflected off the reflector such that it follows the same optical path followed to the reflector, back to the polarization diversity unit 20. When a voltage is applied to the liquid crystal modulator 30 such that the net functionality of the cell(s) is a zero-wave plate, the polarization of the reflected sub-beams exiting the cell(s) is parallel to that of the incident light, and the two sub-beams are recombined at the polarization diversity unit 20 and output through the optical fiber 5. When a voltage is applied to the liquid crystal modulator 30 such that the net functionality of the cell(s) is a half-wave plate, the polarization of the reflected sub-beams exiting the cell(s) is orthogonal to that of the incident light, and the two sub-beams are effectively blocked from optical fiber 5. Variable attenuation of the optical signal is achieved when a voltage is applied to the liquid crystal modulator 30 such that the net functionality of the cell is between a zero-and a half-wave plate.

Notably, it is anticipated that this optical attenuator will exhibit significant polarization dependent loss (PDL) and polarization mode dispersion (PMD). With respect to the latter it is obvious that the e-sub-beam of light will spend more time in the birefringent crystal 26 than the o-sub-beam, and hence there will be an optical path length difference between the two sub-beams of light. With respect to the former, it is evident that even if both sub-beams pass through the same addressable region (e.g., cell) of the modulator, each sub-beam will pass through a different region of the addressable region. Since each addressable region will typically exhibit performance fluctuations and/or non-uniformity, the polarization of the two sub-beams of light will not be altered to the same extent thus contributing to PDL.

Figure 2:
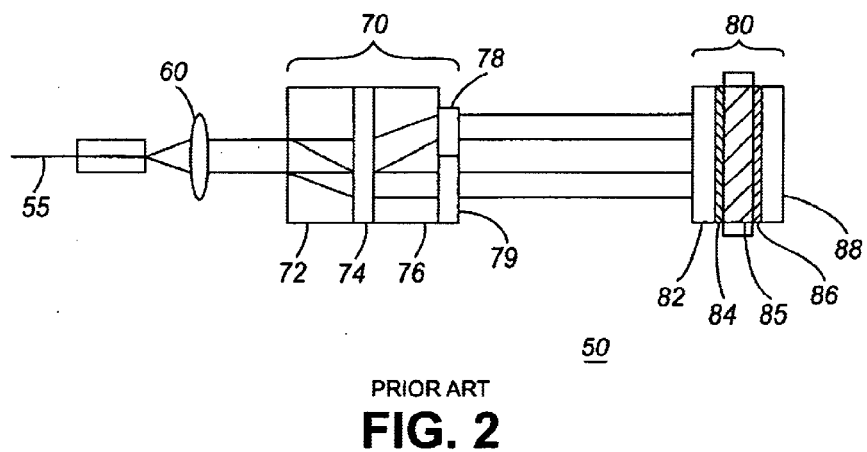
FIG. 2 illustrates a prior art variable optical attenuator having reduced PMD.

Turning now to FIG. 2, there is shown a schematic diagram of another prior art folded variable optical attenuator. The attenuator 50 includes a collimating/focussing lens 60, a polarization diversity unit 70, and a liquid crystal modulator 80. The polarization diversity unit 70 includes a first birefringent crystal 72, such as rutile, a first half-wave plate 74, a second birefringent crystal 76, such as rutile, and a second half-wave plate 78. Optionally, a glass plate 79 is provided. The liquid crystal modulator 80 includes a transparent substrate 82, a patterned conductive layer 84, a liquid crystal 85, such as a nematic, a reflective electrode 86, and a back substrate 88. Preferably, alignment layers (not shown) are deposited on the electrodes 84, 86 with optional isolation layers (not shown) therebetween. Optionally, an optical circulator (not shown) is coupled to optical fibre 55 to separate input and output signals.

In operation, an optical signal transmitted from optical fiber 55 is collimated by lens 60 and is transmitted to the first birefringent crystal 72 where orthogonal components are separated. In particular, the birefringent crystal 72 walks-off one of the components such that two sub-beams of light having orthogonal polarizations states are produced. Both sub-beams of light are transmitted through the first half-wave plate 74, where the polarization of both of the sub-beams of light is altered, and are transmitted into the second birefringent crystal 76. Since both sub-beams of light have passed through the half-wave plate 74, the sub-beams switch walk-off properties. In particular, the sub-beam of light that was transmitted straight through the first birefringent crystal 72 will be walked-off in the second birefringent crystal 76, while the sub-beam of light that was walked-off in the first birefringent crystal 72 will be transmitted straight through the second birefringent crystal 76. The second half-wave plate 78 rotates the polarization of one of the beams (i.e., the e-beam) so as to ensure that both sub-beams of light have the same polarization state. Both sub-beams of light propagate along parallel optical paths until they reach the liquid crystal modulator 80, where they pass through the same or different addressable region (or cell), and are reflected off the reflective electrode 86 in a backwards direction. In particular, each sub-beam of light is retro-reflected off the electrode 86 such that it follows the same optical path followed to the modulator 80, back to the polarization diversity unit 70. When the net functionality of the cell(s) is a zero-wave plate, the polarization of the reflected sub-beams exiting the cell(s) is parallel to that of the incident light, and the two sub-beams are recombined at the polarization diversity unit 70 and output through the optical fiber 55. When a voltage is applied to the liquid crystal modulator 90 such that the net functionality of the cell(s) is a half-wave plate, the polarization of the reflected sub-beams exiting the cell(s) is orthogonal to that of the incident light, and the two sub-beams are effectively blocked from optical fiber 55. Variable attenuation of the optical signal is achieved when a voltage is applied to the liquid crystal modulator 80 such that the net functionality of the cell is between a zero-and a half-wave plate.

Since this arrangement makes the optical path lengths of both sub-beams through the birefringent materials substantially similar, the PMD is reduced as compared to the PMD exhibited by the attenuator shown in FIG. 1. However, since the two sub-beams still pass through a different region of the liquid crystal cell, PDL is still a problem.

Figure 3:
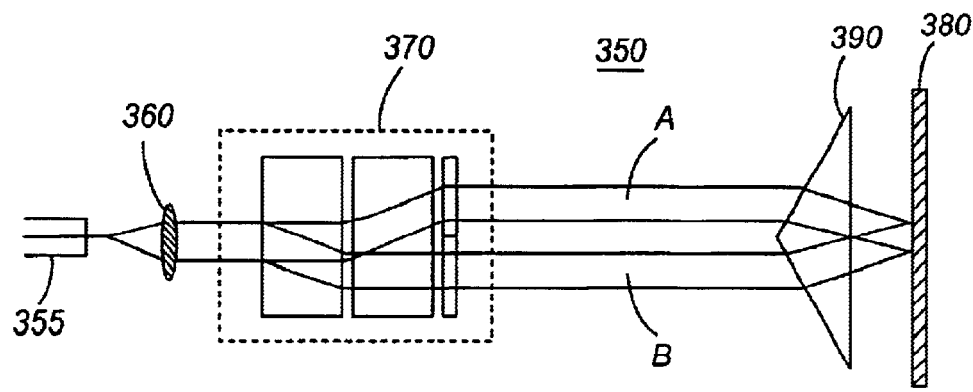
FIG. 3 is a schematic diagram of a variable optical attenuator in accordance with an embodiment of the instant invention using a roof prism.

Referring to FIG. 3, there is shown a schematic diagram of a folded variable optical attenuator in accordance with an embodiment of the invention. The attenuator 350 includes a collimating/focussing lens 360, a polarization diversity unit 370, a liquid crystal modulator 380, and a transparent prism 390. The polarization diversity unit 370 and liquid crystal modulator 380 are the same as the polarization diversity unit 70 and liquid crystal modulator 80, shown in FIG. 2, respectively. The prism 390, which in this embodiment is shown as a roof prism, is designed and positioned such that both sub-beams of light are directed to the same, overlapping area of the liquid crystal modulator 380, and such that each sub-beam of light is reflected in a backwards direction where it retraces the forward propagating optical path of the other sub-beam of light. Optionally, an optical circulator (not shown) is coupled to optical fibre 355 to separate input and output signals.

In operation, a diverging optical signal transmitted from optical fiber 355 is collimated by lens 360 and is transmitted to the polarization diversity unit 370. The polarization diversity unit produces two sub-beams of light having the same polarization as discussed above with respect to FIG. 2. Both sub-beams of light propagate along parallel optical paths until they reach the prism 390. Sub-beam A passes through one half of prism 390 and is redirected to a central region of liquid crystal cell 380, while sub-beam B passes through the other half of the prism 390 and is redirected to the same, central region of the liquid crystal cell 380. Each sub-beam of light is reflected off the reflective electrode in the liquid crystal cell 380 in a backwards direction such that it follows the same optical path back to the polarization diversity unit 370 that the other sub-beam of light followed to the liquid crystal cell 380. When the net functionality of the cell is a zero-wave plate, the polarization of the reflected sub-beams exiting the cell is parallel to that of the incident light, and the two sub-beams are recombined at the polarization diversity unit 370 and output through the optical fiber 355. When a voltage is applied to the liquid crystal modulator 390 such that the net functionality of the cell is a half-wave plate, the polarization of the reflected sub-beams exiting the cell is orthogonal to that of the incident light, and the two sub-beams are effectively blocked from optical fiber 355. Variable attenuation of the optical signal is achieved when a voltage is applied to the liquid crystal modulator 380 such that the net functionality of the cell is between a zero-and a half-wave plate.

Since this arrangement makes the optical path lengths of both sub-beams through the birefringent materials the same (i.e., the two sub-beams of light trace out identical paths), PMD is eliminated. Moreover, since the two sub-beams pass through the same region of liquid crystal cell, PDL is also eliminated. In fact, any imperfections in the system that would lead to PDL with out the prism 390 simply leads to insertion loss with the prism 390 in place, because both sub-beams of light experience all imperfections.

Figure 4:
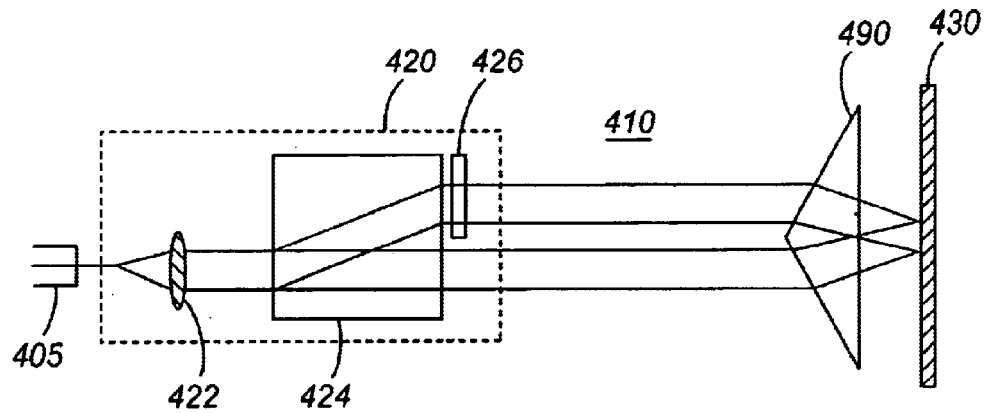
FIG. 4 is a schematic diagram of a variable optical attenuator in accordance with another embodiment of the instant invention using a roof prism.

Although the embodiment shown in FIG. 3 includes two rutiles in the polarization diversity unit 370, this is not necessary for the instant invention. Referring to FIG. 4 there is shown a schematic diagram of a folded variable optical attenuator in accordance with an embodiment of the invention. The attenuator 410 includes a polarization diversity unit 420, a liquid crystal modulator 430, and a transparent prism 490. The polarization diversity unit 420 includes a collimating lens 422, a birefringent crystal 424, such as rutile, and a half-wave plate 426. The liquid crystal modulator 430 is analogous to the liquid crystal modulator 80 shown in FIG. 2. The prism 490 is designed and positioned such that both sub-beams of light are directed to the same, overlapping area of the liquid crystal modulator 430, and such that each sub-beam of light is reflected in a backwards direction where it retraces the forward propagating optical path of the other sub-beam of light. Optionally, an optical circulator (not shown) is coupled to optical fibre 405 to separate input and output signals.

In operation, an optical signal transmitted from optical fiber 405 is collimated by lens 422 and is transmitted to the birefringent crystal 424 where orthogonal components are separated. In particular, the birefringent crystal 424 walks-off one of the components such that two sub-beams of light having orthogonal polarizations states are produced. The half-wave plate 426 rotates the polarization of one of the beams (i.e., the e-beam) so as to ensure that both sub-beams of light have the same polarization state. Both sub-beams of light propagate along parallel optical paths until they reach the prism 490. One sub-beam of light passes through one half of prism 490 and is redirected to a central region of liquid crystal cell 430, while the other sub-beam of light passes through the other half of the prism 490 and is redirected to the same, central region of the liquid crystal cell 430. Each sub-beam of light is reflected off the reflective electrode in the liquid crystal cell 430 in a backwards direction such that it follows the same optical path back to the polarization diversity unit 420 that the other sub-beam of light followed to the liquid crystal cell 430. When the net functionality of the cell is a zero-wave plate, the polarization of the reflected sub-beams exiting the cell is parallel to that of the incident light, and the two sub-beams are recombined at the polarization diversity unit 420 and output through the optical fiber 405. When a voltage is applied to the liquid crystal modulator 430 such that the net functionality of the cell is a half-wave plate, the polarization of the reflected sub-beams exiting the cell is orthogonal to that of the incident light, and the two sub-beams are effectively blocked from optical fiber 405. Variable attenuation of the optical signal is achieved when a voltage is applied to the liquid crystal modulator 430 such that the net functionality of the cell is between a zero-and a half-wave plate.

Notably, the embodiment shown in FIG. 4 has fewer parts and is less complicated than the embodiment shown in FIG. 3.

Figure 5:
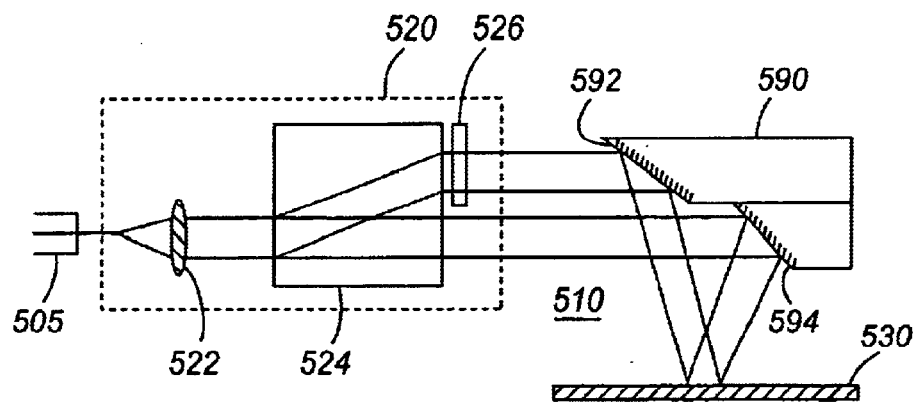
FIG. 5 is a schematic diagram of a variable optical attenuator in accordance with an embodiment of the instant invention using a split-mirror.

Referring to FIG. 5 there is shown a schematic diagram of a folded variable optical attenuator in accordance with an embodiment of the invention. The attenuator 510 includes a polarization diversity unit 520, a liquid crystal modulator 530, and a split-mirror 590. The polarization diversity unit 520 includes a collimating lens 522, a birefringent crystal 524, such as rutile, and a half-wave plate 526. The liquid crystal modulator 530 is analogous to the liquid crystal modulator 80 shown in FIG. 2. The split-mirror 590 is designed and positioned such that both sub-beams of light are directed to the same, overlapping area of the liquid crystal modulator 530, and such that each sub-beam of light is reflected in a backwards direction where it retraces the forward propagating optical path of the other sub-beam of light. In particular, the split-mirror 590 includes a first reflective surface 592 that is non-parallel to a second reflective surface 594. Optionally, an optical circulator (not shown) is coupled to optical fibre 505 to separate input and output signals.

In operation, an optical signal transmitted from optical fiber 505 is collimated by lens 522 and is transmitted to the birefringent crystal 524 where orthogonal components are separated. In particular, the birefringent crystal 524 walks-off one of the components such that two sub-beams of light having orthogonal polarizations states are produced. The half-wave plate 526 rotates the polarization of one of the beams (i.e., the e-beam) so as to ensure that both sub-beams of light have the same polarization state. Both sub-beams of light propagate along parallel optical paths until they reach the split-mirror 590. One sub-beam of light impinges the reflective surface 592 and is redirected to a central region of liquid crystal cell 530, while the other sub-beam of light is transmitted to the other reflective surface 594 and is redirected to the same, central region of the liquid crystal cell 530. Each sub-beam of light is reflected off the reflective electrode in the liquid crystal cell 530 in a backwards direction such that it follows the same optical path back to the polarization diversity unit 520 that the other sub-beam of light followed to the liquid crystal cell 530. When the net functionality of the cell is a zero-wave plate, the polarization of the reflected sub-beams exiting the cell is parallel to that of the incident light, and the two sub-beams are recombined at the polarization diversity unit 520 and output through the optical fiber 505. When a voltage is applied to the liquid crystal modulator 530 such that the net functionality of the cell is a half-wave plate, the polarization of the reflected sub-beams exiting the cell is orthogonal to that of the incident light, and the two sub-beams are effectively blocked from optical fiber 505. Variable attenuation of the optical signal is achieved when a voltage is applied to the liquid crystal modulator 530 such that the net functionality of the cell is between a zero-and a half-wave plate.

Figure 6:
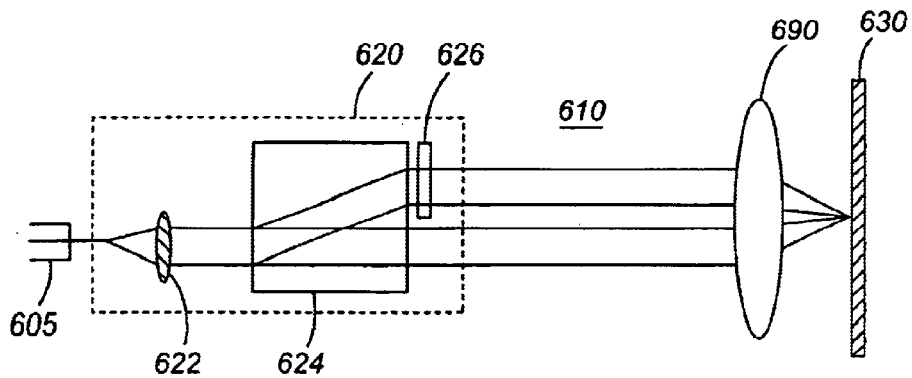
FIG. 6 is a schematic diagram of a variable optical attenuator in accordance with an embodiment of the instant invention using a beam-swapping lens.

Referring to FIG. 6 there is shown a schematic diagram of a folded variable optical attenuator in accordance with an embodiment of the invention. The attenuator 610 includes a polarization diversity unit 620, a liquid crystal modulator 630, and a lens 690. The polarization diversity unit 620 includes a collimating lens 622, a birefringent crystal 624, such as rutile, and a half-wave plate 626. The liquid crystal modulator 630 is analogous to the liquid crystal modulator 80 shown in FIG. 2. The lens 690 is designed and positioned such that both sub-beams of light are directed to the same, overlapping area of the liquid crystal modulator 630, and such that each sub-beam of light is reflected in a backwards direction where it retraces the forward propagating optical path of the other sub-beam of light. For example, in one embodiment the lens 690 is a spherical lens. In another embodiment, the lens 690 is a cylindrical lens. The operation of the attenuator 610 is analogous to the operation of the attenuator 410 described with respect to FIG. 4, with the exception that the lens 690 has optical power and roof prism 490 does not.

Figure 7:
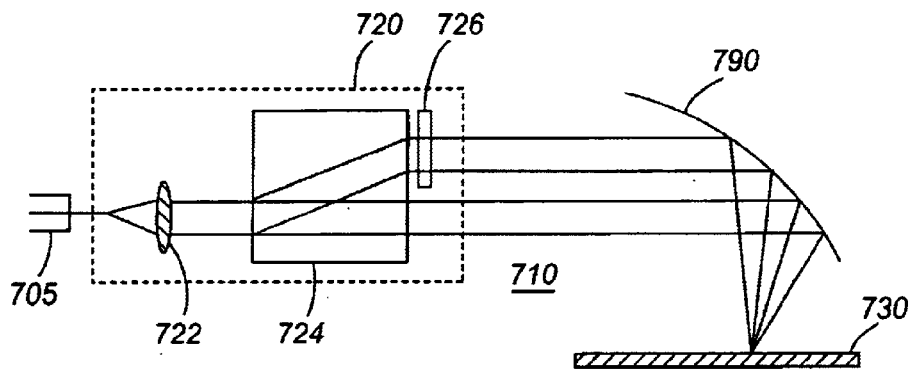
FIG. 7 is a schematic diagram of a variable optical attenuator in accordance with an embodiment of the instant invention using a beam-swapping concave mirror; and, FIG. 8 is a schematic diagram of a variable optical attenuator in accordance with another embodiment of the instant invention using a split-mirror.

Referring to FIG. 7 there is shown a schematic diagram of a folded variable optical attenuator in accordance with an embodiment of the invention. The attenuator 710 includes a polarization diversity unit 720, a liquid crystal modulator 730, and a spherical mirror 790. The polarization diversity unit 720 includes a collimating lens 722, a birefringent crystal 724, such as rutile, and a half-wave plate 726. The liquid crystal modulator 730 is analogous to the liquid crystal modulator 80 shown in FIG. 2. The mirror 790 is designed and positioned such that both sub-beams of light are directed to the same, overlapping area of the liquid crystal modulator 730, and such that each sub-beam of light is reflected in a backwards direction where it retraces the forward propagating optical path of the other sub-beam of light. For example, in one embodiment the mirror 790 is a spherical mirror. In another embodiment, the mirror 790 is a cylindrical mirror. The operation of the attenuator 710 is analogous to the operation of the attenuator 510 described with respect to FIG. 5, with the exception that the mirror 790 has optical power, while split mirror 590 has two distinct planar reflective surfaces.

Figure 8:
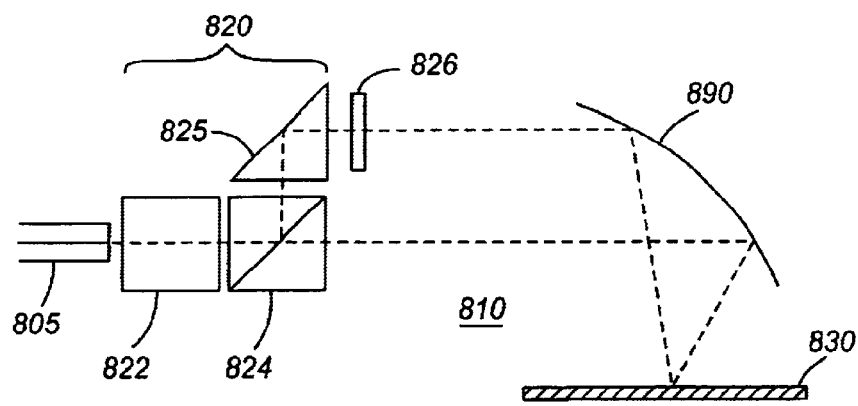

Referring to FIG. 8 there is shown a schematic ray diagram of a folded variable optical attenuator in accordance with an embodiment of the invention. The attenuator 810 includes a polarization diversity unit 820, a liquid crystal modulator 830, and a split-mirror 890. The polarization diversity unit 820 includes a GRIN lens 822, a polarization beamsplitter 724, a right angle prism 825, and a half-wave plate 826. The liquid crystal modulator 830 is analogous to the liquid crystal modulator 80 shown in FIG. 2. The mirror 890 is designed and positioned such that both sub-beams of light are directed to the same, overlapping area of the liquid crystal modulator 830, and such that each sub-beam of light is reflected in a backwards direction where it retraces the forward propagating optical path of the other sub-beam of light. The operation of the attenuator 810 is analogous to the operation of the attenuator 510 described with respect to FIG. 5, with the exception that the polarization beamsplitter 824 diverts the two orthogonally polarized beams of light at right angles, and the right angle prism 825 sets them parallel to each other.

The instant invention has been described with respect to a variable optical attenuator for illustrative purposes only. In many optical devices in accordance with the instant invention, a diffraction grating is included for separating each of the sub-beams of light according to wavelength, in addition to other collimating/focussing/redirecting optics. For example, it is possible to use a spherical mirror to relay the optical signal between the polarization diversity unit, the diffraction grating and the modulator array. Accordingly, the instant invention also extends to other optical devices, such as dynamic gain equalizers (DGEs), configurable optical add/drop multiplexers (COADMs), wavelength selective wavelength blockers (WBs), wavelength selective switches, etc. Similarly, the instant invention has been described with respect to a LC modulator for illustrative purposes only. The instant invention extends to other modulating arrays, such as other LC arrays or MEMS arrays, and also extends to other polarization diversity units. Advantageously, the beam swapping mirror, lens, prism, etc, in accordance with the instant invention is functional in multi-port optical devices.

Notably, the embodiments shown in FIGS. 3, 4, 5, and 8 are advantageous in that the PDL mitigating prism/mirror does not negatively affect the collimating/focussing effects provided by other optics within the device.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. A method of beam swapping comprising the steps of:
   providing an input optical signal;
   spatially separating the input optical signal into first and second beams of light having orthogonal polarizations;
   rotating the polarization of at least one of the first and second beams of light so that the first and second beams have a same polarization state;
   routing the first beam of light to a first surface of a beam swapping element and the second beam of light to a second other surface of the beam swapping element, the first and second surfaces disposed to redirect the first and second beams of light, respectively, to a same location;
   modifying the first and second beams substantially at the same location and reflecting them in a backwards directions such that the first beam of light is transmitted to the second surface of the beam swapping element and the second beam of light is transmitted to the first surface of the beam swapping element; and
   rotating the polarization of at least one of the first and second beams of light transmitted such that they have orthogonal polarization states and recombining them to form an output optical signal.

2. An optical beam swapping device comprising:
   a polarization diversity unit for receiving an input optical signal and producing a first beam of light and a second beam of light therefrom, the first and second beams of light having a same polarization state;
   a beam swapping element disposed for receiving the first and second beams of light and for redirecting the two beams of light to a same point;
   a modulator disposed substantially about the same point for modifying the first and second beams of light; and
   a reflective surface for reflecting the two modified beams of light back to the polarization diversity unit where they are combined to form an output optical signal, wherein each of the first and second beams of light traces out the other's optical path in reverse.

3. An optical device according to claim 2, wherein the beam swapping element comprises one of a lens, a roof prism, a concave mirror, and a split mirror.

4. An optical device according to claim 3, wherein the polarization diversity unit comprises one of a birefringent crystal and a polarization beamsplitter.

5. An optical device according to claim 4, wherein the polarization diversity unit comprises a half-wave plate.

6. An optical device according to claim 5, wherein the modulator comprises a LC array.

7. An optical device according to claim 6, wherein the reflective surface comprises a reflective electrode of the LC array.

8. An optical device according to claim 5, wherein the modulator comprises a MEMS array.

9. An optical device according to claim 8, wherein the reflective surface comprises a planar mirror disposed behind the MEMS array.

10. An optical device according to claim 8, wherein the reflective surface comprises a reflective MEMS element.

11. An optical device according to claim 2, wherein the modulator comprises one of a MEMS modulator and a LC modulator.

12. An optical device according to claim 2, wherein the polarization diversity unit comprises at least one of a lens, a birefringent crystal, a polarization beamsplitter, and a half-wave plate.

13. An optical device according to claim 2, wherein the polarization beamsplitter comprises a birefringent crystal.

14. An optical device according to claim 2, wherein the beam swapping element comprises a first planar surface for receiving the first beam of light and a second planar surface for receiving the second beam of light, the first and second planar surfaces non-parallel to one another.

15. An optical device according to claim 14, wherein the first and second planar surfaces are angled surfaces of a transmissive roof prism.

16. An optical device according to claim 14, wherein the first and second planar surfaces are reflective surfaces of a split mirror.

17. An optical beam swapping device comprising:
   a polarization diversity unit for receiving an input optical signal and producing a first and a second beam of light therefrom;
   a beam swapping element disposed for receiving the first and second beams of light and for redirecting the two beams of light to a same point;
   an optical component having a local spatial dependence on an optical property disposed substantially at the same point; and a reflective surface disposed for receiving the two beams of light directed to the same point and reflecting them back to the polarization diversity unit where they are combined to form an output optical signal, wherein each of the first and second beams of light is reflected in a backward propagating direction along an optical path that the other beam of light followed to the reflective surface in a forward propagating direction.

18. An optical device according to claim 17, wherein the beam swapping element comprises one of a lens, a roof prism, a concave mirror, and a split mirror.

19. An optical device according to claim 17, wherein the optical component comprises one of a MEMS modulator and a LC modulator.

20. An optical device according to claim 17, wherein the polarization diversity unit comprises at least one of a lens, a birefringent crystal, a polarization beamsplitter, and a half-wave plate.

21. An optical device comprising:

polarization diversity means for providing first and second spatially separated beams of light from a single input beam of light;

reflective means disposed for receiving the first and second beams of light and redirecting them back to the polarization diversity means where they are recombined into a single output beam of light; and a beam swapping element optically disposed between the polarization diversity means and the reflecting means for forcing the first and second beams of light to swap optical paths upon reflection from the reflecting means.

* * * * *